United States Patent
Qian et al.

(10) Patent No.: US 9,785,664 B2
(45) Date of Patent: *Oct. 10, 2017

(54) GATHERING TRANSACTION DATA ASSOCIATED WITH LOCALLY STORED DATA FILES

(71) Applicant: Amazon Technologies, Inc., Seattle, WA (US)

(72) Inventors: Dawei Qian, Beijing (CN); Xiangdong Liang, Beijing (CN); Chia-hao Chang, Seattle, WA (US); Jin Lai, Beijing (CN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,962

(22) Filed: Jul. 17, 2015

(65) Prior Publication Data
US 2015/0324415 A1  Nov. 12, 2015

Related U.S. Application Data

(63) Continuation of application No. 13/258,373, filed as application No. PCT/CN2011/077941 on Aug. 3, 2011, now Pat. No. 9,087,071.

(51) Int. Cl.
*G06F 17/30* (2006.01)
*G06Q 10/08* (2012.01)

(52) U.S. Cl.
CPC .. *G06F 17/30368* (2013.01); *G06F 17/30174* (2013.01); *G06F 17/30176* (2013.01); *G06Q 10/0875* (2013.01)

(58) Field of Classification Search
CPC ......... G06F 17/30368; G06F 17/30176; G06F 17/30174; G06F 2209/463; G06F 9/465;
(Continued)

(56) References Cited

U.S. PATENT DOCUMENTS 6,098,064 A * 8/2000 Pirolli ............... G06F 17/30902
707/E17.12
6,681,370 B2   1/2004 Gounares et al.
(Continued)

FOREIGN PATENT DOCUMENTS

CN   1368680 A   9/2002
CN   1988535 A   6/2007
(Continued)

OTHER PUBLICATIONS

Office Action received in Japanese Patent Application No. 2014-523162 dated Feb. 9, 2015.
(Continued)

*Primary Examiner* — Anh Ly
(74) *Attorney, Agent, or Firm* — Knobbe Martens Olson & Bear LLP

(57) ABSTRACT

Systems and methods are provided for enabling local storing of one or more portions of data file and recording changes to contents of the data file. In some embodiments, a first data file may be sent to a client system, along with a script to manage the first data file. Changes to the data file may be stored locally, and may then be sent to a remote server upon network reconnection.

20 Claims, 5 Drawing Sheets

(58) Field of Classification Search
CPC . G06F 9/541; G06F 19/3468; G06Q 10/0875; G06Q 10/06; G06Q 10/087; G06Q 10/10; G06Q 10/20; G06Q 20/10; G06Q 30/0222; G06Q 30/0283; G06Q 30/04
USPC .......... 707/769, 671; 705/64, 72, 22, 26, 28, 705/26.1, 26.63, 26.8, 26.81, 27.1
See application file for complete search history.

(56) References Cited

U.S. PATENT DOCUMENTS

| | | | |
|---|---|---|---|
| 7,257,689 B1 | 8/2007 | Baird | |
| 7,324,976 B2 * | 1/2008 | Gupta | G06Q 20/02 705/65 |
| 7,383,231 B2 * | 6/2008 | Gupta | G06Q 20/085 705/64 |
| 7,502,760 B1 * | 3/2009 | Gupta | G06Q 20/367 705/64 |
| 7,644,042 B2 * | 1/2010 | Ramavarjula | G06Q 20/10 705/35 |
| 7,788,233 B1 * | 8/2010 | Iyer | G06F 17/30339 707/661 |
| 2002/0010679 A1 * | 1/2002 | Felsher | G06F 19/322 705/51 |
| 2003/0173402 A1 * | 9/2003 | Ogawa | B65H 1/00 235/381 |
| 2003/0229529 A1 * | 12/2003 | Mui | G06Q 10/06 705/328 |
| 2005/0234936 A1 | 10/2005 | Castro et al. | |
| 2006/0014523 A1 * | 1/2006 | Reilly | G06F 17/30884 707/E17.114 |
| 2006/0235938 A1 * | 10/2006 | Pennell | G06Q 30/02 709/217 |
| 2006/0259949 A1 * | 11/2006 | Schaefer | G06F 17/30082 707/E17.01 |
| 2007/0038516 A1 * | 2/2007 | Apple | G06Q 30/0243 705/14.42 |
| 2007/0050696 A1 * | 3/2007 | Piersol | G06F 21/608 715/210 |
| 2007/0186150 A1 * | 8/2007 | Rao | G06F 17/243 715/205 |
| 2007/0203937 A1 | 8/2007 | Prahlad | |
| 2008/0235132 A1 * | 9/2008 | Banatre | G06Q 20/10 705/39 |
| 2011/0055683 A1 * | 3/2011 | Jiang | G06F 17/30899 715/234 |
| 2011/0218860 A1 * | 9/2011 | Barber | G06Q 10/00 705/14.53 |
| 2011/0307561 A1 * | 12/2011 | Gao | H04H 20/42 709/206 |
| 2013/0173402 A1 * | 7/2013 | Young | G06Q 30/0631 705/14.73 |
| 2013/0173540 A1 * | 7/2013 | Qian | G06F 17/30174 707/625 |
| 2015/0294377 A1 * | 10/2015 | Chow | G06Q 30/0263 705/347 |

FOREIGN PATENT DOCUMENTS

| | | |
|---|---|---|
| CN | 101076828 A | 11/2007 |
| CN | 101587575 A | 11/2009 |
| JP | 2000-035911 | 2/2000 |
| JP | 2003-529119 | 9/2003 |
| JP | 2004-506282 | 2/2004 |
| JP | 2005-535543 | 11/2005 |
| WO | WO 2007/001073 | 1/2007 |

OTHER PUBLICATIONS

Extended Search Report dated Mar. 15, 2015 of corresponding European Patent Application No. 11870399.0.
International Search Report dated May 10, 2012 of PCT/CN2011/077941 which is the parent application in 8 pages.

* cited by examiner

GATHERING TRANSACTION DATA ASSOCIATED WITH LOCALLY STORED DATA FILES

CROSS-REFERENCE TO RELATED APPLICATIONS

This application is a continuation of U.S. patent application Ser. No. 13/258,373, entitled GATHERING TRANSACTION DATA ASSOCIATED WITH LOCALLY STORED FILES, and filed Sep. 26, 2012, now U.S. Pat. No. 9,087,071, which claims priority to and the benefit of PCT/CN2011/077941, filed Aug. 3, 2011, the entire contents of both of which are incorporated herein by reference.

BACKGROUND OF THE INVENTION

Client computing devices may request data files such as web pages, from one or more servers over a network. A client computing device that receives pages or other files from a server may locally store such pages or other files. The locally stored copies of the data files may be presented for display again in the future from the local store without sending a second request to the server, and without requesting the data files from the server a second time. For example, a client computing device may receive from a server a page, such as a HyperText Markup Language ("HTML") page, that includes references to one or more data files that are to be obtained as part of processing the HTML page. The client computing device may then request the one or more data files from the appropriate server and process the requested data files for display. The client computing device may additionally store one or more of the requested data files in a data store local to or accessible to the client computing device. These locally stored copies of the one or more data files may then be used in a subsequently requested page that includes references to the same data files.

In this manner, the local saving of data files facilitates the reduction of the number of requests to the server in order to obtain data files. However, if changes to the locally stored data files are needed, such as to include transaction and interaction data associated with the data files, then the client computing device typically must reconnect to the server to receive an updated version of the data files or utilize a non-updated version of the data files.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to systems and methods for gathering transaction data associated with a data file received from a server and locally stored by a client computing device, such that the client computing device may make changes to the data file by collecting the transaction data locally, without needing to immediately reconnect to the server. As discussed above, existing systems may enable a client computing device to store a local copy of a data file. Additionally, in existing systems, a locally stored copy of a data file cannot be managed without the client computing device connecting to the server. For example, transaction data associated with the data file cannot be updated without connection to the server. Finally, locally saved data files are associated with expiration data that causes the client computing device to consider the locally saved version as stale or no longer valid. For data files that may be subject to change or volatile in nature, such data files are typically associated with short expiration data that typically necessitate a reconnection to the server via the network. A drawback to such an approach when used with existing systems, however, is that the changes to the data file can typically not be made by the client computing device until a network connection is established.

Aspects of the present disclosure enable a data file to include changes in a manner that minimizes connection requests to a server, while also enabling one or more portions of the data file to be separately stored as local copies by the client computing device, such that the one or more portions may be managed by the client computing device.

In certain embodiments, a server as disclosed herein may receive a request from a client system for a data file. In response to the request, the server may send to the client system the data file. The response sent to the client system may also include a script enabling the client system to manage the data file. The script sent from the server may include executable code that performs a number of functions. In one aspect, the executable code may enable the client system to verify the availability of a network connection between the client system and the server. In another aspect, the executable code may enable the client system to collect and process transaction data associated with the data file. In yet another aspect, the executable code may enable synchronization of the transaction data between the client system and the server. Upon network connection availability, the server may receive the changes to the data file from the client system, and thereby create an updated version of the data file that includes the changes that were collected and processed by the client system.

Figure 1:
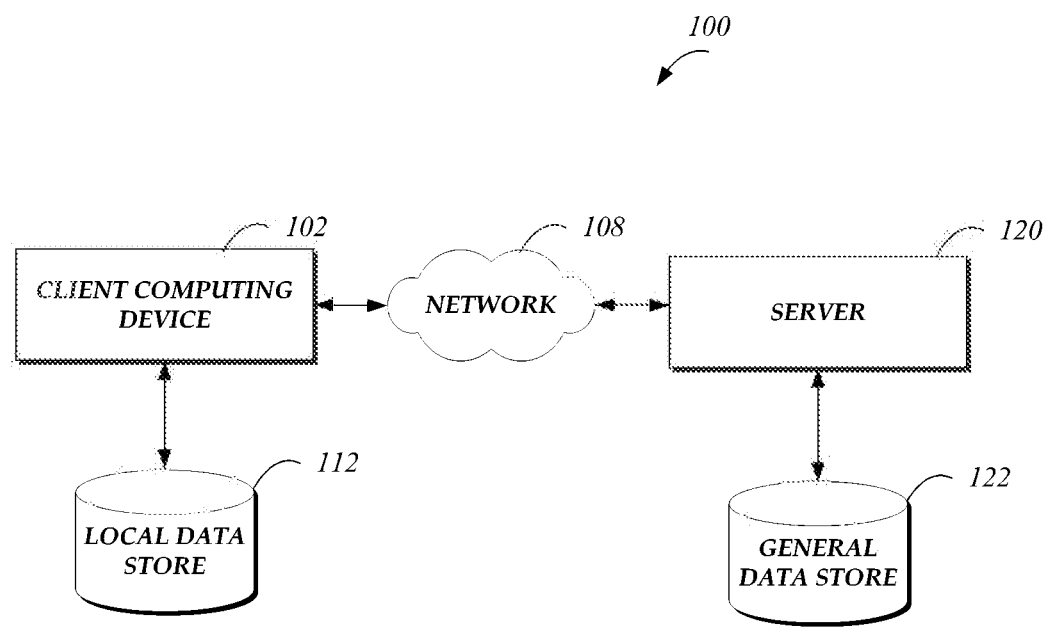
FIG. 1 depicts an illustrative operating environment in which a client computing device may request one or more data files from a server, and may store portions of one or more of the received data files in a local data store.

FIG. 1 depicts an illustrative operating environment 100 in which a client computing device 102 may request one or more data files from a server 120, and then may locally store portions of one or more of the received data files in the local data store 112. The depicted environment 100 includes a client computing device 102 and a server 120 communicatively connected by a network 108, such as the Internet. Those skilled in the art will recognize that the client computing device 102 may be any of a number of computing devices that are capable of communicating over a network including, but not limited to, a laptop, personal computer, tablet computer, electronic book reader, personal digital assistant (PDA), hybrid PDA/mobile phone, mobile phone, and the like. In some embodiments, the client computing device 102 may include computer hardware and software components similar to those described below with respect to the server 120.

As further illustrated in FIG. 1, the server 120 includes or communicates with a general data store 122. The general data store 122 may include data files of one or more types, including, but not limited to, video files, audio files pages, and the like. Those skilled in the art will appreciate that the general data store 122 may be local to the server 120, may be remote to the server 120, and/or may be a network-based service itself.

As illustrated, the client computing device 102 includes or communicates with a local data store 112. The local data store 112 may include shared portions of one or more data files that have been received by the client computing device 102 from the server 120, and may include changes to the one or more data files. In some embodiments, the changes may consist of transaction data recorded on the client computing device 102. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

Figure 2A:
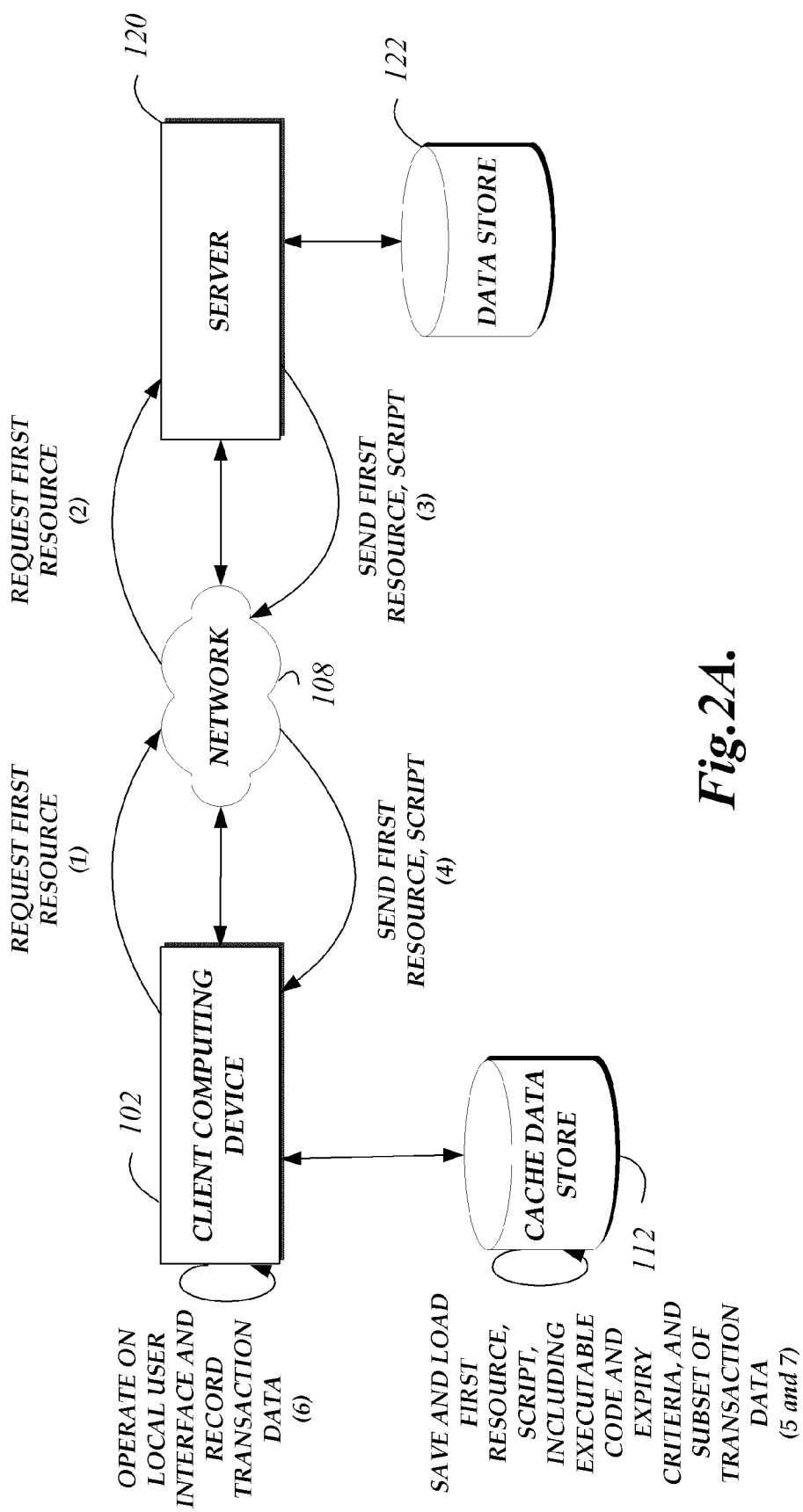
FIG. 2A is a block diagram illustrating a client computing device within the operating environment of FIG. 1 requesting a first data file from a server, and storing the first data file, a script and transaction data in a local data store.

FIG. 2A is a block diagram illustrating the client computing device 102 within the operating environment 100 of FIG. 1. As illustrated in FIG. 2A, the client computing device 102 requests a first data file from the server 120. The client computing device 102 also stores the data file, a script and transaction data in the local data store 112. For purposes of this example, the "first data file" refers to a first data file that is requested and received by the client computing device 102 prior to any changes to the first data file being collected and processed by the client computing device 102 and prior to being stored in the local data store 112. As illustrated, the client computing device 102 sends a first data file request to the server 120. The first data file request may be, for illustrative purposes, a request for a page. The page may include code, such as HTML code, as well as other text, links to other data files, or other executable code. The client computing device 102 may send the first data file request, for example, as a result of a page request generated by a web browser installed on the client computing device 102.

Once the server 120 receives the first data file request, the server 120 may retrieve the first requested data file from the general data store 122. The server 120 may then send the first requested data file to the client computing device 102. The response sent to the client computing device 102 may also include executable code that manages additional functionality provided by the client computing device on behalf of a client computing device. In one aspect, the executable code may enable the client computing device 102 to verify the availability of a network connection between the client computing device 102 and the server. In another aspect, the executable code may enable the client computing device 102 to collect and process transaction data associated with the data file. In yet another aspect, the executable code may enable synchronization of the transaction data between the client computing device 102 and the server 120.

Illustratively, the script may comprise executable code which can be independent of any other applications and/or operating systems running on the client computing device 102. The executable code may be a Java-script file which facilitates management of the client computing device 102. For example, when a user operates on a local user interface of the client computing device 102, the Java-script file on the client computing device 102 may enable integration of transaction data entered on the client computing device 102 with the first data file received. The Java-script file also enables to provide a user interface on the client computing device 102 which supports a user with or without connection to the remote server. Management of the client computing device 102 may also include using the Java-script file to determine whether there is a network connection with the server 120 and to enable the client computing device 102 to send the transaction data to the server 120 whenever network connection is established again between the client computing device 102 and the server 120. The transaction data may be sent for each transaction performed on the client computing device 102. The transaction data may also be sent periodically from the client computing device 102 to the server 120, independent of transactions performed.

When the client computing device 102 receives the first data file from the server 120, the client computing device 102 may processes the first data file, such as by rendering graphical images on a user interface. For example, if the first data file is a page, video, or other file that may be displayed, the client computing device may present the first data file for display. If the first data file includes audio data, the client computing device may cause playback of the audio data. If the first data file includes embedded references to additional data files, such as an image, a file containing additional code, a video, and the like, the client computing device 102 may request the additional data files from the server 120 and/or one or more additional servers (not illustrated). The content of the page, optionally including additional data files that are associated with or referenced by the page, may be presented for display, for example, as a user interface displayed via a navigation interface such as a web browser installed on the client computing device 102.

As discussed above, the client computing device 102 may store in the local data store 112 any changes made to the first data file, as indicated transaction data input on the client computing device. For example, the first data file may be a file associated with the delivery of a shipment to a customer. The client computing device 102 may be a hand-held device used by a delivery associate. The delivery associate may wish to enter transaction data associated with attempts to deliver the shipment to the customer. The associates failed attempts to reach the customer to make the shipment, and the successful delivery of the shipment may each be examples of transaction data that may be entered by the delivery associate, on the hand-held device, without a connection to the server.

In some embodiments, the first data file may be associated with short expiration data. In such instances, successive changes made to the first data file may overwrite previous changes made to the data file and stored on the local data store 112. In the example above, the successful delivery of the shipment may overwrite the previously recorded failed attempts. Alternatively, all changes made to the first data file may be stored with associated sequence identifiers on the local data store 112, and only the most recent changes may be transmitted to the server 120 upon reconnection. In the above example, the failed attempts would be stored on the local data store 112, while the successful delivery details would be transferred to the server upon reconnection. In yet other embodiments, all changes made may be transmitted to the server 120, along with the associated sequence identifiers. In the above example, details for all of the failed and successful attempts would be transferred to the server. In various embodiments, the script may be associated with expiry criteria. In some aspects, the expiry criteria may be based on a version identifier associated with the script. The version identifier may comprise a version number, a time stamp, and the like. Similarly, the decision of which data to transmit to the server 120 may be based on expiry criteria. Expiry criteria may comprise a period of time. Expiry criteria may also comprise a threshold number of successive changes made to the data file.

In some embodiments, code, such as JavaScript, included in the first data file received from the server 120 (or in an additional data file received from the server 120) may be executed by the client computing device 102 in order to manage the client computing device, including to enter such transaction data. The information stored in the local data store may include, for example, the script, including an executable code associated with an expiry criterion, along with a subset of transaction data recorded at the client computing device 102 while the executable code is valid based on the expiry criterion.

Figure 2B:
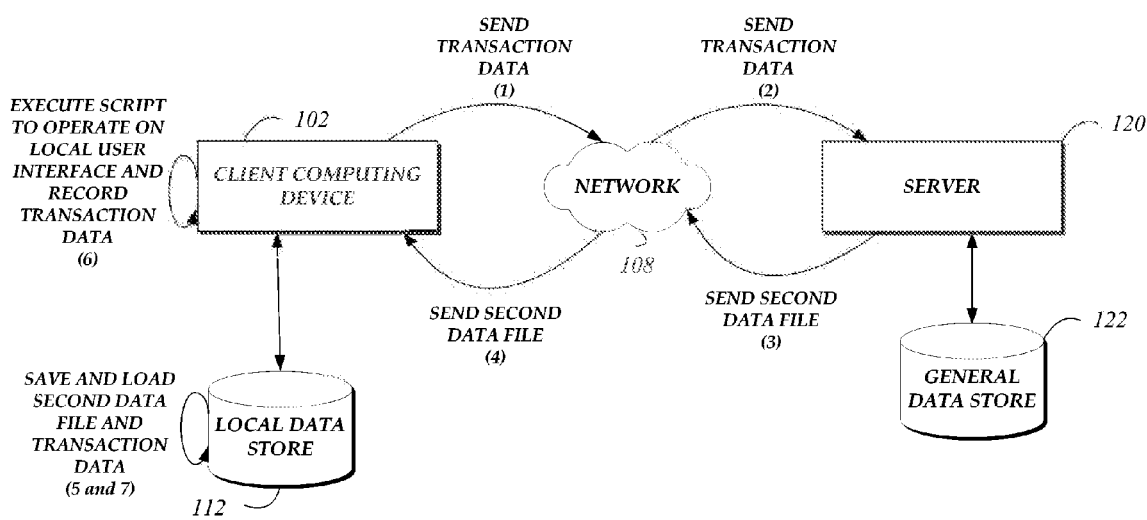
FIG. 2B is a block diagram illustrating a client computing device within the operating environment of FIG. 1 sending transaction data to the server, and receiving a second data file from the server.

FIG. 2B is a block diagram illustrating the client computing device 102 within the operating environment 100 of FIG. 1 sending transaction data to the server 120, and receiving a second data file from the server 120. For purposes of this example, the "second data file" refers to a data file that is received by the client computing device 102 after transaction data has been sent to the server 120. For example, a second data file may include both the first data file previously sent to the client computing device 102 and the transaction data sent by the client computing device 102. As illustrated, the blocks depicted in FIG. 2B occur after the blocks in FIG. 2A have occurred, although other data files (not illustrated) may have been received by the client computing device 102 in between the first data file described above with respect to FIG. 2A being received and the second data file described below with respect to FIG. 2B being received.

As illustrated in FIG. 2B, the client computing device 102, after using the script to determine that a network connection exists, sends transaction data to the server 120. The transaction data may be, for illustrative purposes, information recorded on the client computing device 102 in relation to a transaction performed, as discussed above. The transaction performed may be a delivery, and the transaction data may include delivery details. Once network connection is established between the client computing device 102 and the server 120, the server 120 may receive the transaction data and may incorporate the transaction data with one or more data files from the general data store 122.

The server 120 may send a second data file to the client computing device 102. As will be appreciated, it is not necessary that the server 120 actually store the modified second data file. For example, in some embodiments, the modified second data file may be sent to the client computing device 102 as it is constructed by the server 120.

When the client computing device 102 receives the modified second data file from the server 120, the client computing device 102 may retrieve from the local data store 112 the script included in, or with the first data file. The client computing device 102 may then present the content of the second data file (as determined from the content of the modified first data file) for display, playback, and the like, as appropriate for the given data file type. The client computing device 102 may then record additional transaction data on the modified second data file loaded using the script. Such transaction data may be stored locally on the local data store 112 until a network connection is established with the server 120 again.

Figure 3:
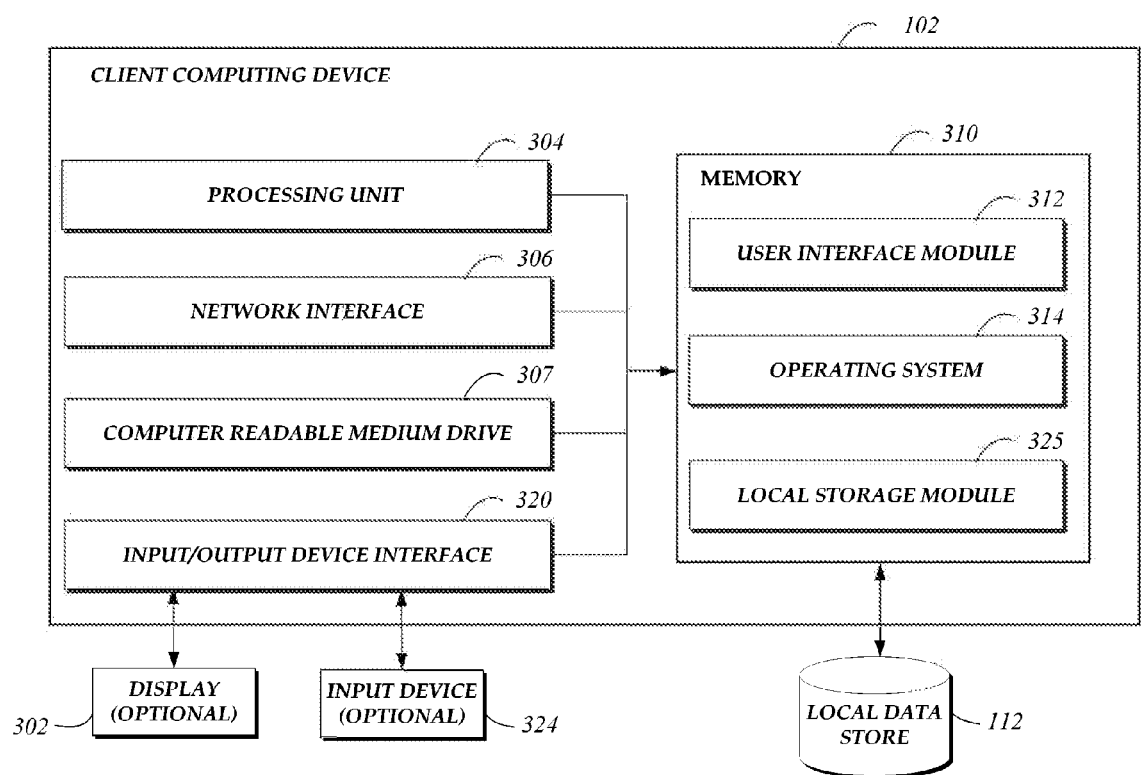
FIG. 3 depicts a general architecture of a client computing device for requesting data files from a server and for storing data files, scripts and transaction data to a local data store.

FIG. 3 depicts a general architecture of a client computing device 102 for requesting data files from a server 120 and for storing data files, scripts and transaction data to a local data store 112. The embodiment of client computing device 102 depicted in FIG. 3 includes an arrangement of computer hardware and software components that may be used to implement aspects of the present disclosure. Those skilled in the art will appreciate that the client computing device 102 may include many more (or fewer) components than those shown in FIG. 3. It is not necessary, however, that all of these generally conventional components be shown in order to provide an enabling disclosure. As illustrated in FIG. 3, the client computing device 102 includes a processing unit 304, a network interface 306, a computer readable medium drive 307 and an input/output device interface 320, all of which may communicate with one another by way of a communication bus. As illustrated, the client computing device 102 is optionally associated with, or in communication with, a display 302, and an input device 324. The network interface 306 may provide the client computing device 102 with connectivity to one or more networks or computing systems. The processing unit 304 may thus receive information and instructions from other computing systems or services via a network. The processing unit 304 may also communicate to and from memory 310 and further provide output information for an optional display 302 via the input/output device interface 320. The input/output device interface 320 may accept input from the optional input device 324, such as a keyboard, mouse, digital pen, touch screen, or gestures recorded via motion capture.

The memory 310 contains computer program instructions that the processing unit 304 executes in order to implement one or more embodiments of the present disclosure. The memory 310 generally includes RAM, ROM and/or other persistent or non-transitory memory. The memory 310 may store an operating system 314 that provides computer program instructions for use by the processing unit 304 in the general administration and operation of the client computing device 102. The memory 310 may further include other information for implementing aspects of the present disclosure. For example, in one embodiment, the memory 310 includes a user interface module 312 that facilitates generation of user interfaces (such as by providing instructions therefor) for display upon a computing device. For example, a user interface may be displayed via a navigation interface such as a web browser installed on the computing device 102. In addition, memory 310 may include or communicate with a local data store 112, discussed above.

In addition to the user interface module 312, the memory 310 may include a local storage module 325 that may be executed by the processing unit 304. In one embodiment, the local storage module 325 may be used to implement various aspects of the present disclosure, such as comparing one or more data files to identify transaction data that may have been locally stored by the client computing device, as described further below. In certain embodiments of the present disclosure, the server 120 may include several components that operate similarly to the components illustrated as part of the client computing device 102, including a user interface module, processing unit, computer readable medium drive, and the like.

Figure 4:
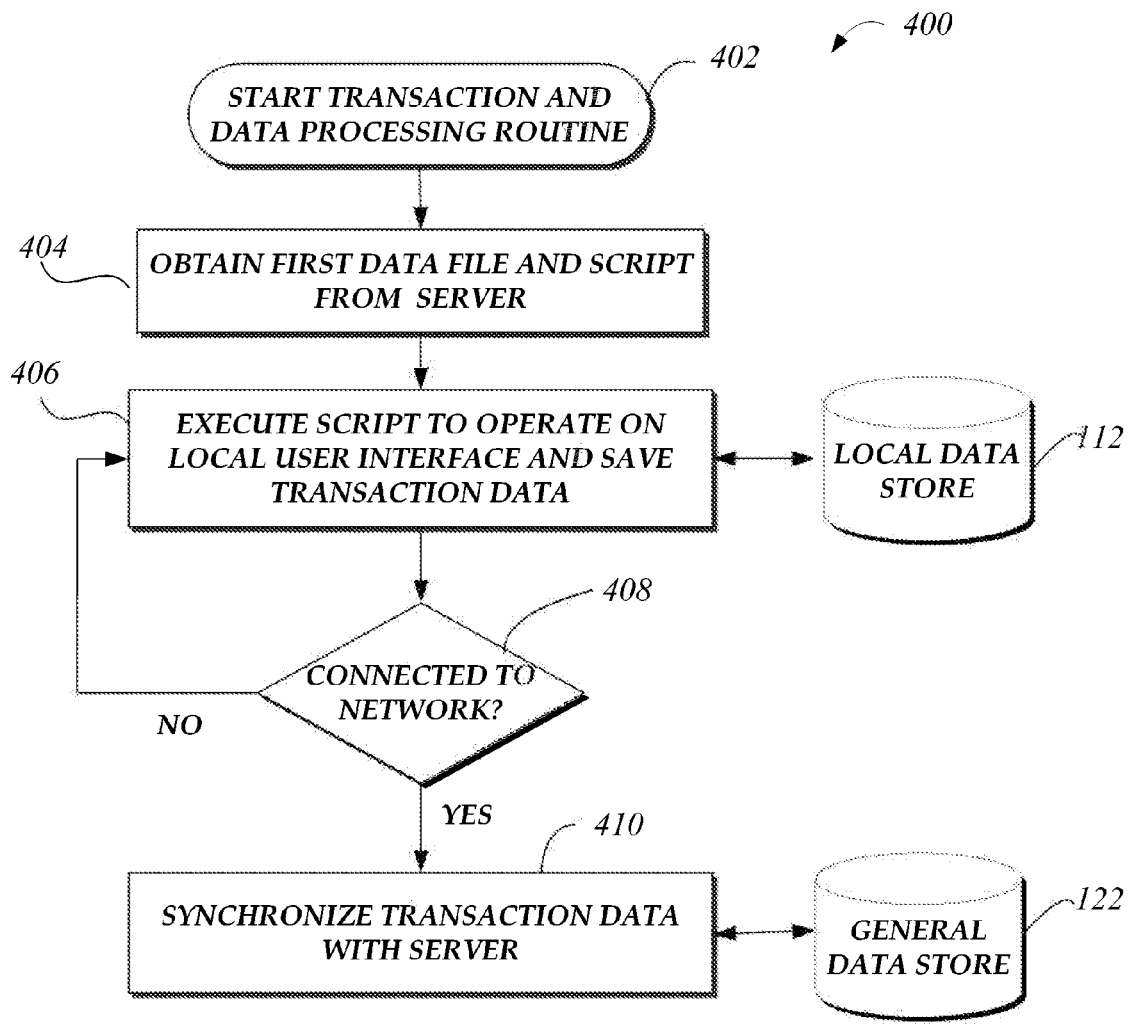
FIG. 4 is a flow diagram of an illustrative transaction data processing routine implemented by a client computing device.

FIG. 4 is a flow diagram of an illustrative method 400 implemented by the client computing device 102 to synchronize data files and transaction data between the local data store 112 and the server 120. The illustrative method 400 may be implemented at least in part by the caching module 325. While the method 400 is illustrated using the example of a single data file or grouped data files, in some embodiments, the illustrated method may be implemented for each data file in general data store 122, and/or each data file in the local data store, or for a subset of the data files. For example, in some embodiments, the server 120 may modify each data file in general data store 122 to include transaction data received on a periodic basis, such as nightly, weekly, etc. In other embodiments, the server 120 may modify one or more data files in general data store 122 to include transaction data received in response to a triggering event, such as the creation or modification of transaction data or a new data file being stored in the general data store 122. In other embodiments, the illustrated method 400 may be implemented in response to a client computing device, such as the client computing device 102, requesting a data file from the server 120.

The method 400 begins at block 402, then proceeds to block 404, where the client computing device 102 receives a first data file and a script from server 120 or another server. The first data file may be any data file stored in the general data store 122, or in another data store. The script may be one of a variety of executable codes, such a Java-script file, or another type of file to enable various management and control functions implemented on the client computing device 102. As previously described, the management and control functions can include collection and processing of transaction data, verification of network connectivity between the client computing device 102 and the server, and integration of transaction data with the first data file on the client computing device 102 and on the server.

At block 406, the script on the client computing device 102 enables collection and processing of transaction data on the first data file by accepting operations on a local user interface of the client computing device. If the script on the client computing device 102 determines at block 408 that there is no connection to a network in order to send transaction data to the server 120, the client computing device 102 continues to record transaction data, and saves the collected and processed transaction data on the local data store 112. If instead the script on the client computing device 102 determines at block 408 that there is a connection to a network, the script on the client computing device 102 proceeds to block 410, where the client computing device 102 sends transaction data to the server 120 in order to get synchronized with the server 120. The server 120 may save such transaction data on the general data store 122. At block 410, when a network connection is determined to be present, the server 120 may also send updated data to the client computing device 102.

The above methods discussed throughout the present disclosure may result in smaller, and/or less data files being sent from the server 120 to the client computing device 102, because previously locally stored shared portions may be sent only once, rather than being sent again for subsequent data file requests. The above methods may additionally or alternatively result in decreasing the number of connections or requests from the client computing device 102 to the server 120, because content may be included in a single data file, where the same content might otherwise be split into multiple data files in order to take advantage of the existing full file caching of other systems. As will be appreciated, enabling caching of portions of a data file and other aspects of the present disclosure may be implemented for a variety of data file types. Accordingly, many types of content accessible over a network may benefit from aspects of the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for enabling browsing of a page, the system comprising:
    a computing device configured to communicate with a remote server via a network, the remote server storing a first data file and an executable code associated with an expiry criterion, the computing device comprising a local file store and operative to:
    execute the executable code to generate a set of changes related to the first data file when a network connection to the remote server is not available;

select a subset of changes from the generated set of changes, wherein the subset of changes comprises one or more changes generated while the executable code is valid based on the expiry criterion;

store, on the local file store, the subset of changes related to the first data file; and cause the transmission of the subset of changes related to the first data file when the computing device is connected to the remote server.

2. The system of claim 1, wherein the expiry criterion comprises a threshold number of changes related to the first data file.

3. The system of claim 2, wherein the subset of changes comprises a number of changes less than or equal to the threshold number.

4. The system of claim 3, wherein the subset of changes comprises a series of successive changes.

5. The system of claim 4, wherein the series of successive changes includes at least one of the earliest changes in the series or the latest change in the series.

6. A computer-implemented method for accessing a data file, the computer-implemented method comprising:

as implemented by one or more computing devices configured with specific executable instructions, receiving content responsive to a request for a set of data files stored on a remote data store, the content including an executable code, an expiry criterion associated with the executable code, and the set of data files from the remote data store;

executing the executable code to obtain a set of changes for the set of data files;

selecting a subset of the set of changes from the generated set of changes, wherein the subset of the set of changes comprises one or more changes generated while the executable code is valid based on the expiry criterion;

storing the set of changes on a local file store;

determining that the one or more computing devices are connected to the remote data store via the network; and sending to the remote data store the subset of the set of changes stored on the local file store.

7. The computer-implemented method of claim 6, wherein the expiry criterion comprises a period of time in which changes will be accepted.

8. The computer-implemented method of claim 6, wherein the expiry criterion specifies a size of the set of changes stored on the local file store.

9. The computer-implemented method of claim 6, wherein the computer-implemented method further comprises identifying the subset of the set of changes.

10. The computer-implemented method of claim 9, wherein each change of the set of changes is associated with a respective sequence identifier, and wherein identifying the subset of the set of changes comprises identifying a change with an earliest sequence identifier.

11. The computer-implemented method of claim 9, wherein each change of the set of changes is associated with a respective sequence identifier, and wherein identifying the subset of the set of changes comprises identifying a change with a latest sequence identifier.

12. A non-transitory, computer-readable medium having a computer-executable component, the computer-executable component comprising computer-executable instructions, the computer-executable instructions configured to:

in response to receiving, from a server comprising a remote data store, executable code comprising at least one expiry criterion, execute the executable code to process changes for a first data file, wherein the changes are input by entering transaction data;

execute the executable code to store the changes on a local file store;

execute the executable code to determine whether the local file store is connected to the server via a network;

select a subset of the changes from the processed changes, wherein the subset of the changes comprises one or more changes processed while the executable code is valid based on the expiry criterion; and when the determination is that the local file store is connected to the server, execute the executable code to send to the server the subset of changes.

13. The non-transitory, computer-readable medium of claim 12, wherein the expiry criterion is a threshold number of changes to the first data file.

14. The non-transitory, computer-readable medium of claim 13, wherein the subset comprises a number of changes not exceeding the threshold number.

15. The non-transitory, computer-readable medium of claim 13, wherein each of the changes for the first data file is associated with a respective sequence identifier, and wherein the subset includes at least a change associated with an earliest sequence identifier.

16. The non-transitory, computer-readable medium of claim 13, wherein each of the changes for the first data file is associated with a respective sequence identifier, and wherein the subset includes at least a change associated with a latest sequence identifier.

17. The non-transitory, computer-readable medium of claim 12, wherein the computer-executable instructions are further configured to identify the subset of changes.

18. The non-transitory, computer-readable medium of claim 12, wherein the computer-executable instructions are further configured to:

receive, from the server, a second data file, the second data file comprising one or more updates to the first data file.

19. The non-transitory, computer-readable medium of claim 18, wherein the one or more updates are based at least in part on the subset of changes.

20. The non-transitory, computer-readable medium of claim 18, wherein the computer-executable instructions are further configured to apply the one or more updates to the first data file.

* * * * *